US006842817B2

(12) United States Patent
Avery (10) Patent No.: US 6,842,817 B2
(45) Date of Patent: Jan. 11, 2005

(54) METHOD FOR GENERATING CONFIGURATION TABLES AND FOR FORWARDING PACKETS THROUGH A NETWORK

(75) Inventor: James M. Avery, Westford, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 525 days.

(21) Appl. No.: 09/905,516

(22) Filed: Jul. 13, 2001

(65) Prior Publication Data

US 2004/0225782 A1 Nov. 11, 2004

(51) Int. Cl.[7] .............................................. G06F 13/36

(52) U.S. Cl. ...................................................... 710/306

(58) Field of Search ....................... 710/314; 709/230; 714/45; 370/229, 256, 389, 401, 3

(56) References Cited

U.S. PATENT DOCUMENTS

| 4,860,357 | A |   | 8/1989  | Avery ........................... 381/41 |
|-----------|---|---|---------|------------------------------------------|
| 4,926,418 | A |   | 5/1990  | Cidon ......................... 370/85.5 |
| 5,245,609 | A |   | 9/1993  | Ofek ........................... 370/94.3 |
| 5,802,054 | A | * | 9/1998  | Bellenger .................... 370/401    |
| 5,878,238 | A | * | 3/1999  | Gan et al. .................... 710/314   |
| 5,889,776 | A | * | 3/1999  | Liang .......................... 370/389  |
| 6,058,436 | A |   | 5/2000  | Kosco .......................... 710/11   |
| 6,118,788 | A |   | 9/2000  | Kermani ...................... 370/461    |
| 6,181,702 | B1| * | 1/2001  | Egbert ......................... 370/401  |
| 6,230,227 | B1| * | 5/2001  | Fry et al. ..................... 710/314  |
| 6,311,220 | B1| * | 10/2001 | Fischer et al. ............... 709/230    |
| 6,538,990 | B1| * | 3/2003  | Prorock ....................... 370/229   |
| 6,584,586 | B1| * | 6/2003  | McCoy ......................... 714/45    |
| 2001/0021177 | A1| * | 9/2001 | Ishii ............................ 370/256 |

OTHER PUBLICATIONS

API NetWorks, Inc., The Lightning Data Transport I/O Bus Architecture, Revision 1001, 2000.
API NetWorks, Inc., HyperTransport: Universal Interconnect Solution for I/O, Mar. 7, 2001.
API NetWorks, Inc., Lightning Data Transport: Universal Interconnect Solution for I/O, Dec. 13, 2000.
API NetWorks, Inc., HyperTransport Applications in Embedded DSP/RISC Based Systems: A High–Bandwidth, Low–Complexity Embedded I/O Interconnect Architecture.
PCI–to–PCI Bridge Architecture Specification, Revision 1.1, Dec. 18, 1998.
PCI Local Bus Specification, Revision 2.2, Dec. 18, 1998.
Robert M. Metcalfe, Ethernet: Distributed Packet Switching for Local Computer Networks, Jul. 1976.
J. W. Son, An input polling arbitration mechanism for a gigabit packet switch.
Cisco Systems, Dynamic Packet Transport Technology and Performance, 2000.
Farooq M. Anjum, Balanced–RED: An Algorithm to achieve Fairness in the Internet, Mar. 8, 1999.
William H. Press, Numerical Recipes in C, 1992, Chapters 12 and 13.

(List continued on next page.)

Primary Examiner—Glenn A. Auve
Assistant Examiner—Christopher E. Lee
(74) Attorney, Agent, or Firm—Park, Vaughan & Fleming LLP (57) ABSTRACT

A method performed by a computer system that includes a host processor coupled to a first bus, a first switch coupled to the first bus and a second bus, a second switch coupled to the second bus and a third bus, and a device coupled to the third bus. The method of storing information in a configuration register in the device includes: issuing a first configuration transaction onto the first bus; forwarding the first configuration transaction to the second bus; translating the first configuration transaction into a second configuration transaction; forwarding the second configuration transaction to the third bus; and storing information in the configuration register.

41 Claims, 11 Drawing Sheets

OTHER PUBLICATIONS

Alain Mayer, Local and Congestion–Driven Fairness Algorithm in Arbitrary Topology Networks, Jun. 2000.

Cisco, Dynamic Packet Transport Technology and Performance.

Rajendra K. Jain, A Quantitative Measure of Fairness and Discrimination for Resource Allocation in Shared Computer System, Sep. 26, 1984.

Sangyup Shim, Supporting Continuous Media: Is Serial Storage Architecture (SSA) Better Than SCSI?, 1997.

Mark W. Garrett, Analysis, Modeling and Generation of Self–Similar VBR Video Traffic, 1994.

Will E. Leland, On the Self–Similar Nature of Ethernet Traffic, 1994.

Jonathan H. B. Deane, The dynamics of deterministic data networks, Jun. 12, 1996.

Terence D. Todd, The Token Grid Network, Jun. 1994.

Jan Beran, Fitting Long–Memory Modules by Generalized Linear Regression, Dec. 1993.

Jan Beran, Statistical Methods for Data with Long–Range Dependence, Nov. 1992.

Jan Beran, On robust local polynomial estimation with long–memory errors.

Mark W. Garrett, Contributions toward real–time services on packet switched networks, 1993.

Jonathan H. B. Deane, Chaotic traffic flow in local area networks.

Edward Ott, Chaos in Dynamical Systems, 1993.

* cited by examiner

Figure 1

| Command Bits | Capabilities Pointer | Capability ID | | |
|---|---|---|---|---|
| P3 Mask | P2 Mask | P2 Match | P1 Match | P1 Mask | P0 Mask | P0 Match |
| P7 Mask | P6 Mask | P6 Match | P5 Match | P5 Mask | P4 Mask | P4 Match |
| ... | ... | ... | ... | ... | ... | ... |

| Command Bits | | Capabilities Pointer | | Capability ID | |
|---|---|---|---|---|---|
| S3 Match | S2 Match | S1 Match | S0 Match | | |
| S3 Mask | S2 Mask | S1 Mask | S0 Mask | | |
| S7 Match | S6 Match | S5 Match | S4 Match | | |
| S7 Mask | S6 Mask | S5 Mask | S4 Mask | | |

METHOD FOR GENERATING CONFIGURATION TABLES AND FOR FORWARDING PACKETS THROUGH A NETWORK

1. FIELD OF THE INVENTION

The present invention generally relates to hierarchical networks. More specifically, the present invention relates methods of generating configuration tables and forwarding packets through a hierarchical network.

2. BACKGROUND

In an effort to increase I/O bandwidth in high performance processor based systems, a number of companies have developed the HyperTransport ("HT") I/O interconnect structure. Briefly, the HT I/O interconnect structure is a scalable device level architecture that provides a significant increase in transaction throughput over existing I/O bus architectures such as Peripheral Component interconnect ("PCT") and Advanced Graphics Port ("AGP").

The foundation of the HT I/O interconnect is dual point-to-point unidirectional links consisting of a data path, control signals, and clock signals. The HT I/O interconnect can provide both point-to-point links and a scalable network topology using HT I/O switching fabrics. Thus, an HT based system can be expanded using HT switches to support multilevel, highly complex systems.

Communications between multiple HT I/O devices are known as data streams. Each data stream contains one or more packets of information. Each packet of information contains a packet ID and a data payload. The packet ID is also commonly referred to as a unit ID. Because all packets are transferred to or from a host bridge, the packet ID provides information that can be utilized to determine the source or destination of the packet. A more detailed description of the HT I/O interconnect structure is presented in Appendix A.

While HT switches that handle multiple HT I/O data streams and manage the interconnection between attached HT I/O devices have been proposed in concept, no methods for managing configuration of such switches are known. Similarly, no methods for efficiently forwarding packets through such switches are known. Thus, a need exists for efficiently managing configuration of and packet forwarding through HT switches.

3. SUMMARY OF INVENTION

One embodiment of the invention is a method, performed by a computer system that includes a host processor coupled to a first bus, a first switch coupled to the first bus and a second bus, a second switch coupled to the second bus and a third bus, and a device coupled to the third bus. The method of storing information in a configuration register includes: issuing a first configuration transaction onto the first bus; forwarding the first configuration transaction to the second bus; translating the first configuration transaction into a second configuration transaction; forwarding the second configuration to the third bus; and storing information in the configuration register.

Another embodiment of the invention is a method, performed by a computer system that includes a host processor coupled to a first bus, a first switch coupled to the first bus and a second bus, a second switch coupled to the second bus and a third bus, and a device coupled to the third bus. The method of retrieving information from a configuration register includes: issuing a first configuration transaction onto the first bus; forwarding the first configuration transaction to the second bus; translating the first configuration transaction into a second configuration transaction; forwarding the second configuration transaction to the third bus; and retrieving information from the configuration register.

Another embodiment of the invention is a method, performed by a computer system that includes a host processor coupled to a bus and a switch coupled to the bus. The method includes: issuing a configuration transaction that includes a primary-segment field and includes a secondary-segment field onto the bus; and receiving the configuration transaction in the switch.

Another embodiment of the invention is a method, performed by a computer system that includes a host processor coupled to a bus, and a switch coupled to the bus. The method generates a configuration-forwarding table by: detecting the presence of the switch; determining the number of primary ports present in the switch; for each primary port present in the switch, determining if the primary port is enabled or disabled; and for each enabled primary port in the switch, storing a value in the configuration-forwarding table that identifies the primary segment number of the bus that is coupled to the port.

Another embodiment of the invention is a method, performed by a computer system that includes a host processor coupled to a first bus, and a switch coupled to the first bus, of generating a configuration-forwarding table. The method includes: detecting the presence of the switch; determining the number of secondary ports present in the switch; for each secondary port present in the switch, determining if the secondary port is enabled or disabled; and for each enabled secondary port in the switch, storing a value in the configuration-forwarding table that identifies the secondary segment number of the bus that is coupled to the port.

Another embodiment of the invention is a method, performed by a computer system that includes a host processor coupled to a first bus, a first switch coupled to the first bus and a second bus, and a second switch coupled to the second bus. The method of forwarding a configuration transaction includes: issuing a type1 configuration transaction on the first bus; receiving the type1 configuration transaction in the first switch; evaluating a logical equation; if the result of the evaluation of the logical equation is a first value, then forwarding the type1 configuration transaction to the second switch.

Still another embodiment of the invention is a method, performed by a computer system that includes a host processor that is coupled to a first bus, and a switch that is coupled to the first bus. The method of forwarding a packet includes: receiving a packet, determining the Unit ID of the packet; retrieving a primary-segment value from a first storage location within the switch; retrieving a secondary-segment value from a second storage location within the switch; forwarding the packet through a port that is coupled to a bus that is identified by the primary-segment value and the secondary-segment value.

5. DESCRIPTION OF THE PREFERRED EMBODIMENTS

The following description is presented to enable any person skilled in the art to make and use the invention, and is provided in the context of a particular application and its requirements. Various modifications to the disclosed embodiments may be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 Computer System with a Plurality of HT I/O Devices and an HT I/O Switch

Figure 1:
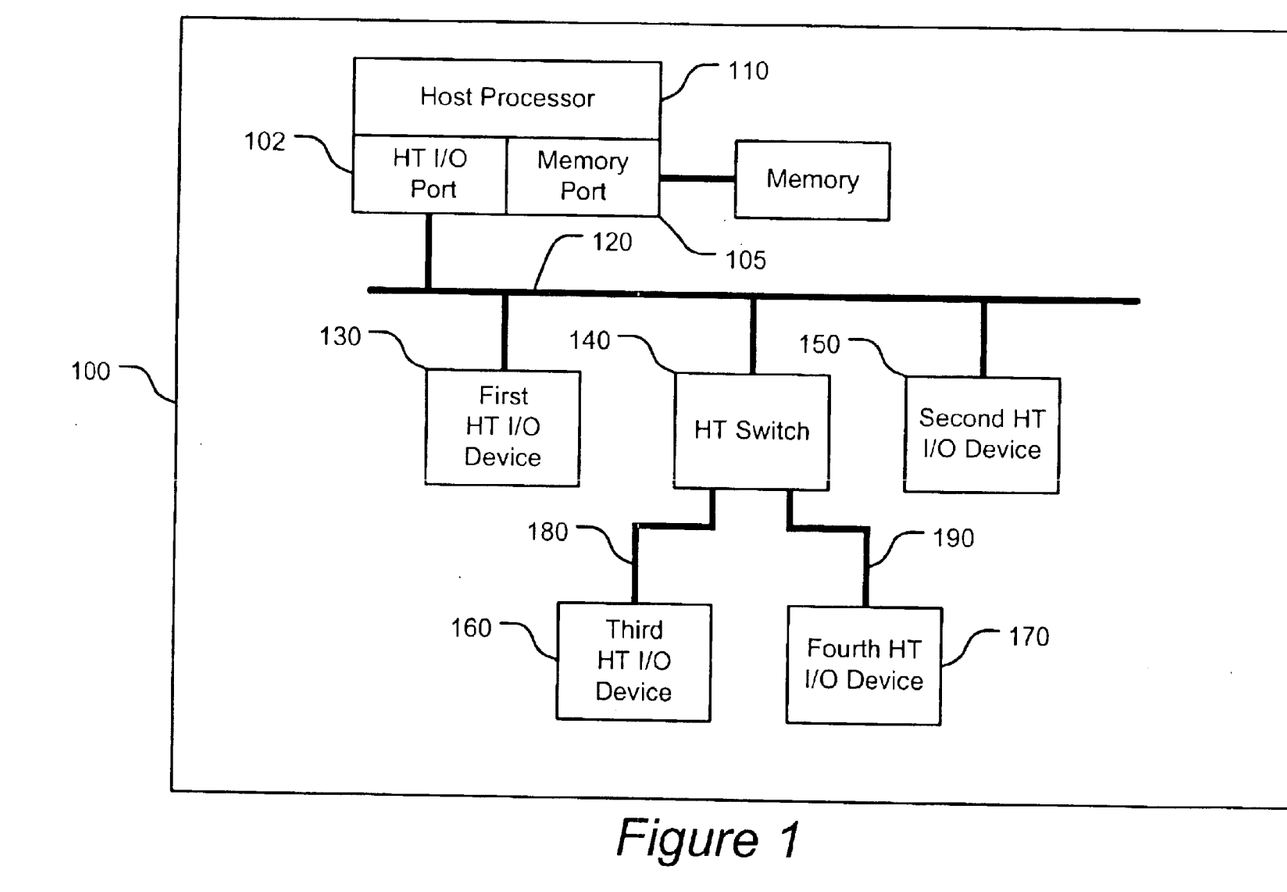
FIG. 1 presents a computer system.

One embodiment of the invention is shown in FIG. 1, which presents a computer system 100. The computer system 1 00 contains a host processor 110 that includes an HT I/O port 102 and a memory port 105. The HT I/O port 102 is coupled to a first HT I/O interconnect 120. The first HT I/O interconnect 120 is also coupled to a first HT I/O device 130, an HT switch 140, and a second HT I/O device 150. The HT switch 140 is also coupled to a third HT I/O device 160 and a fourth HT I/O device 170.

5.2 HT I/O Device

The first HT I/O device 130 contains a plurality of configuration registers. The plurality of configuration registers store information about the HT I/O device 130. A portion of these configuration registers may be similar to the configuration registers defined in the PCI Local Bus Specification, Revision 2.2. For example, the configuration registers could store information such as the HT I/O device's vendor ID, device ID, device class, Base Address Registers ("BARs"), capabilities, and status. Some of the configuration registers in the first HT I/O device 130 may be read from and written to. However, other configuration registers may only be read from. For example, the configuration register that contains an HT I/O device's vendor D is typically a read only register.

The second HT I/O device 150, the third HT I/O device 160, and the fourth HT I/O device 170 would also typically contain configuration registers such as those described above.

5.3 HT Switch

The HT switch 140 contains one primary port and two secondary ports (not shown). A primary port is a port that is closer to the host processor than other ports on the HT switch. A secondary port is a port that is further from the host processor than other ports on the HT switch. The HT switch's primary port is coupled to the first HT I/O interconnect 120. The HT switch's first secondary port is coupled, via segment 180, to the third HT I/O device 160. Similarly, the HT's second secondary port is coupled, via segment 190, to the fourth HT I/O device 170.

The HT switch 140 also contains a plurality of configuration registers. Some of the configuration registers are similar to the configuration registers described in the PCI-to-PCI Bridge Architecture Specification Revision 1.1. For example, the HT switch's configuration registers could contain the switch's vendor ID, device ID, device class, Base Address Registers (BARs), capabilities, and status. However, in addition, to the above configuration registers, in some embodiments of the invention, an HT switch may also include a plurality of configuration-forwarding tables and a packet-forwarding table.

5.4 Primary Configuration-Forwarding Tables

A configuration-forwarding table may be associated with a specific HT switch port. In such embodiments, a configuration-forwarding table is used to forward configuration transactions from the port on an HT switch that has been associated with the configuration-forwarding table to another port on the HT switch. Such forwarding is discussed in more detail in Section 5.6.4 and Section 5.9.2.

Figure 2:
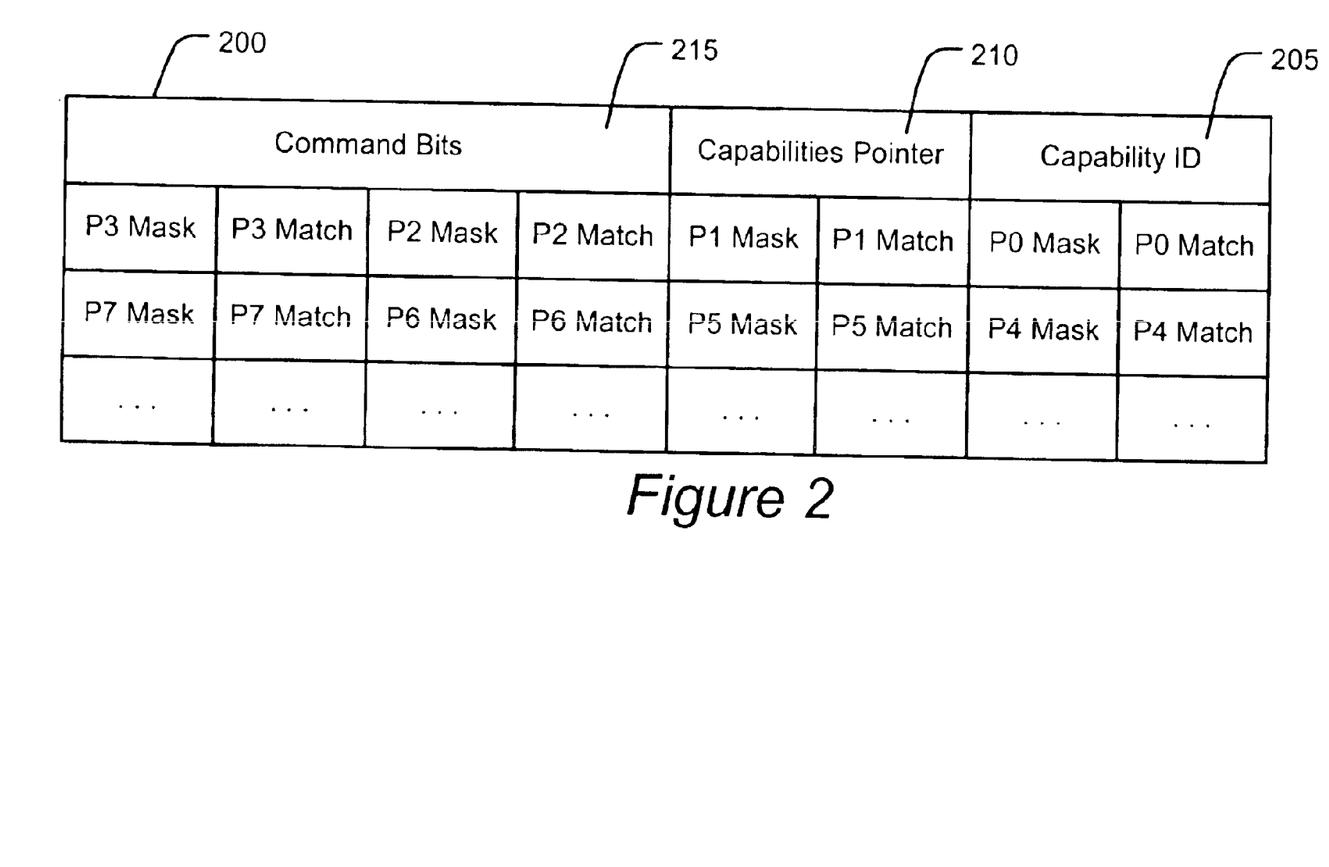
FIG. 2 presents one embodiment of a configuration-forwarding table.

FIG. 2 presents one embodiment of a configuration-forwarding table 200. This configuration-forwarding table 200 is associated with the HT switch's primary port. Because the configuration-forwarding table 200 is associated with a primary port, the table may be referred to as a primary port configuration-forwarding table. Configuration-forwarding table 200 is used to forward configuration packets from the HT switch's primary port to one of the HT switch's secondary ports.

5.4.1 Capability ID

The first element in the configuration-forwarding table 200 is a capability ID 205. The capability ID 205 contains information that indicates that the switch is an HT switch.

5.4.2 Capabilities Pointer

The second element in the configuration-forwarding table 200 is a capabilities pointer 210. The capabilities pointer 210 may contain a pointer to a linked capabilities list that contains HT specific capability registers. Alternatively, if the HT switch does not contain any additional capabilities, then the capabilities pointer 210 may be set to a value of 0. Because the capabilities of a device are device specific, the register that contains the capabilities pointer 210 is typically read only.

5.4.3 Command Bits

The third element in the configuration-forwarding table 200 contains command bits 215. A first group of the command bits may indicate the number of primary port(s) present in the HT switch. In such an embodiment, the first group of command bits would indicate that the HT switch 140 contains one primary port. A second group of command bits may indicate the number of secondary port(s) present in the HT switch. In such an embodiment, the second group of the command bits would indicate that the HT switch 140 contains two secondary ports.

The command bits 215 may also contain a bit that indicates if the configuration-forwarding table is associated with the HT switch's primary ports or is associated with the HT switch's secondary ports. As discussed in Section 5.4, the configuration-forwarding table 200 is associated with the HT switch's primary port. Thus, the above command bit would indicate that the configuration-forwarding table is a primary configuration-forwarding table.

The command bits 215 may also include a third group of bits that indicate the layout of the remainder of the configuration-forwarding table 200.

5.4.4 Configuration Transaction-Forwarding Data

Figure 3:
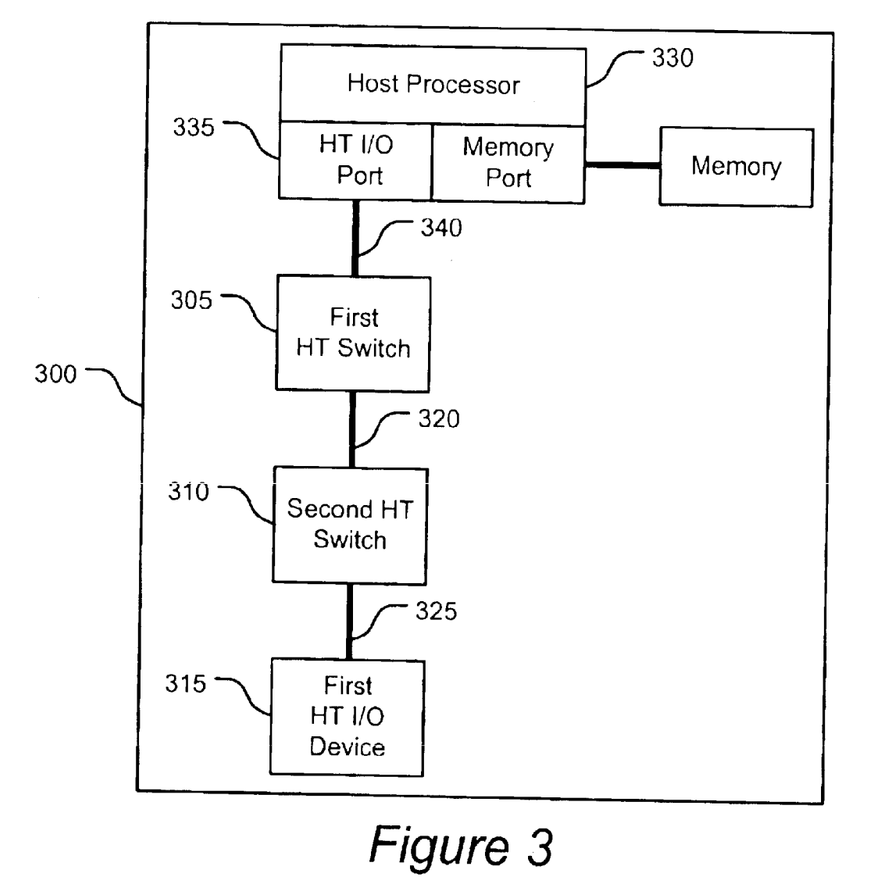
FIG. 3 presents another computer system.

The remainder of the configuration-forwarding table 200 contains configuration transaction-forwarding data. The configuration transaction-forwarding data is utilized by the computer system to forward configuration transactions, such as those discussed in Section 5.9.2, through an HT switch to devices coupled to the HT switch's secondary ports. These devices may be directly coupled to an HT switch. For example, as shown in FIG. 3, the first HT switch 305 is directly coupled to the second HT switch 310 via segment 320. Similarly, segment 325 directly couples the second switch 310 to the first HT I/O device 315. Segments that directly couple a device to an HT switch may be referred to as primary segments with respect to that HT switch.

Devices may also be coupled to an HT switch indirectly. For example, the first HT switch 305 is indirectly coupled to the first HT I/O device 315 via segment 325. Segments that indirectly couple a device to an HT switch may be referred to as secondary segments with respect to that HT switch.

5.4.4.1 Number Range ("Match")

In one embodiment, the first configuration transaction-forwarding element, P0 Match, identifies the primary segment that is directly coupled to the first secondary port of an HT switch. In another embodiment, the first configuration transaction-forwarding element, P0 Match, indicates the number range of the highest numbered HT primary segment that is directly coupled to the first secondary port of an HT switch. As discussed in Section 5.8 and Section 5.9.2, the number range can be used to determine when to respond to type1 configuration transactions on the primary port and forward them to secondary ports as type0 configuration transactions or as type1 configuration transactions.

5 5.4.4.2 Number Span ("Mask")

In one embodiment, the second configuration transaction-forwarding element, P0 Mask, indicates the span of the highest numbered HT primary segment that is coupled to primary port P0. As discussed in Section 5.9.2, the number span can be used to determine when to respond to type1 configuration transactions on the primary port and forward them to secondary ports as type1 configuration transactions.

5.5 Secondary Configuration-Forwarding Tables

Figure 4:
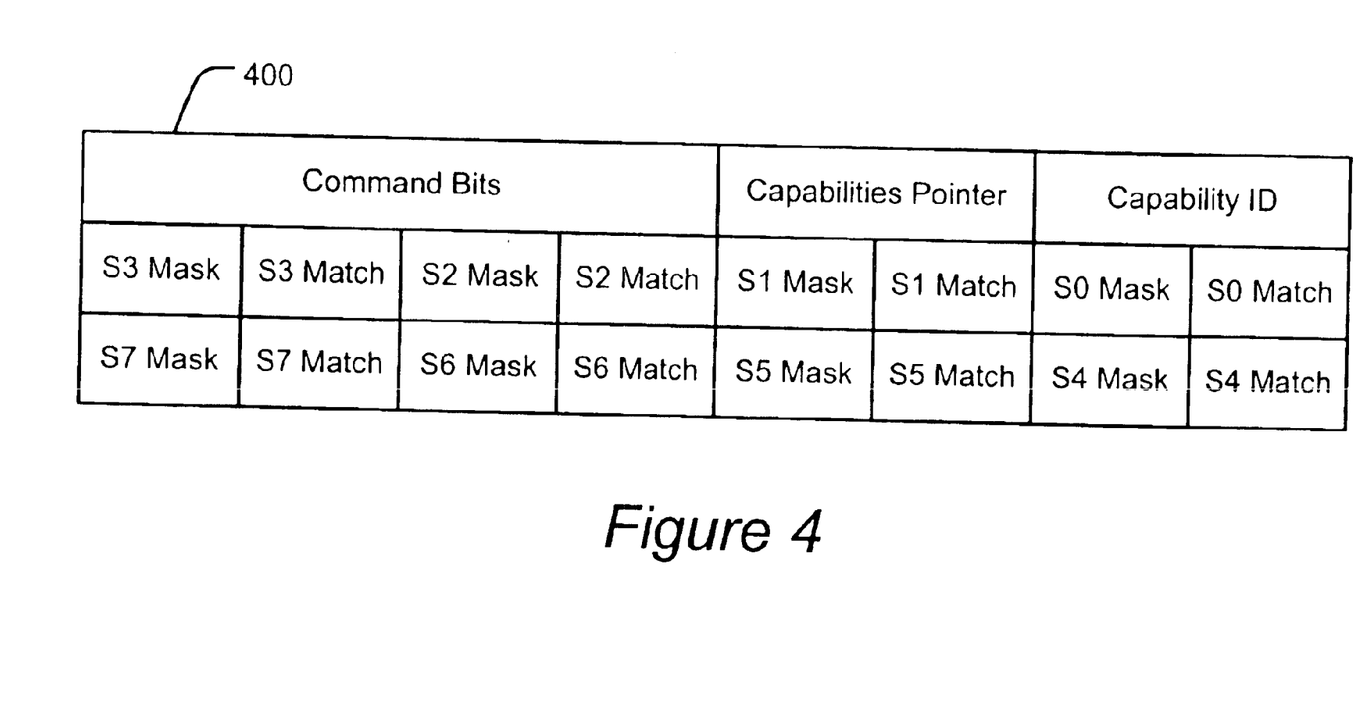
FIG. 4 presents another embodiment of a configuration-forwarding table.

FIG. 4 presents an embodiment of a configuration-forwarding table 400. Configuration-forwarding table 400 is associated with the HT switch's first secondary port. Because the configuration-forwarding table 400 is associated with a secondary port, the table may be referred to as a secondary port configuration-forwarding table. This table may be identical in structure to the primary configuration-forwarding table 200 discussed in Section 5.4. Second configuration-forwarding tables may be used to record the number range, Sy Match, and span, Sy Mask, of the highest numbered HT secondary segment that is connected to secondary port "y."

5.6 Configuration of the First HT Switch

Figure 5:
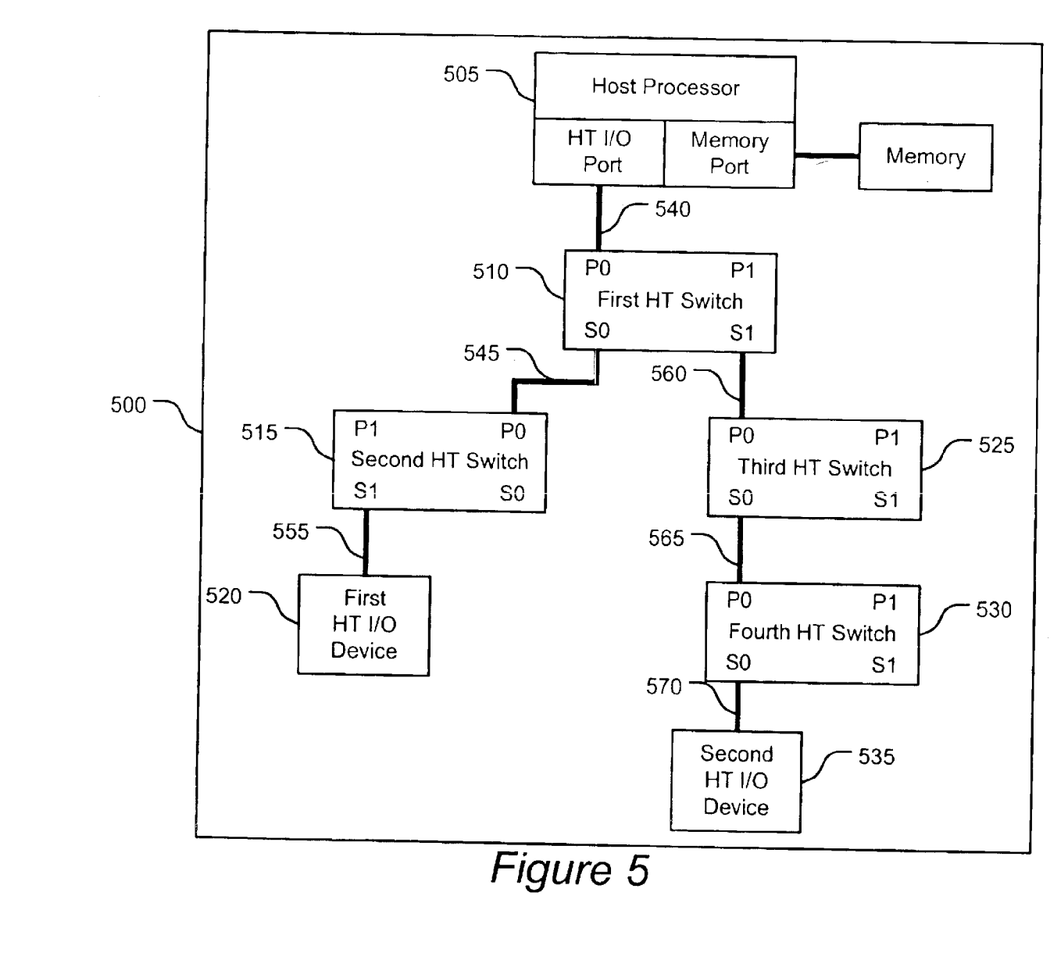
FIG. 5 presents another computer system.

In one embodiment of the invention, when the computer system 500, shown in FIG. 5, is first powered on, software is executed by the host processor 505 that stores values to two temporary variables. In one embodiment, the value 0x1111 may be stored both in a first variable, Temp-Primary-Segment and a second variable, Temp-Secondary-Segment. Next, the software probes the first HT I/O interconnect 540 to determine if any HT I/O devices are coupled to the bus.

5.6.1 Type0 Configuration Transactions

One method of probing the HT I/O interconnect 540 is issuing a type0 configuration read transaction from the host processor 505 onto the HT I/O interconnect 540. Type0 configuration read transactions retrieve information from configuration registers that are located within HT I/O devices that are coupled to an HT I/O interconnect and return such information to the issuer of the transaction. Similarly, a type0 configuration write transaction stores information in the configuration registers that are located within HT I/O devices that are coupled to an HT I/O interconnect.

When the host processor 505 issues a type0 configuration read transaction on the HT I/O interconnect 540, the capabilities of the first HT switch 510 can be retrieved. Because the retrieved capabilities would indicate that an HT switch is coupled to I/O bus 540, the host processor 505 would issue one or more type0 read transactions that retrieve the number of ports in the first HT switch 510.

5.6.2 Define Px Match values

After the host processor 505 determines the number of ports on the first HT switch 510, the Px Match configuration-forwarding table elements that correspond to the enabled and disabled primary ports of the first HT switch 510 may be defined by the host processor 505 using type0 configuration write transactions. An enabled port is a port that is coupled to a device. A disabled port is a port that is not coupled to a device. For example, port P0 of the first HT I/O device 510 is enabled because it is coupled to the host processor 505 and port P1 is disabled because it is not coupled to a device.

In one embodiment, the value of Temp-Primary-Segment, i.e., 0x1111, would be stored in P0 Match because port P0 is enabled. Thus, the first HT switch's port P0 is thereby associated with Primary-Segment 0x1111. Temp-Primary-Segment would then be decremented by one. The value of Temp-Primary-Segment, i.e., 0x1110 would not be stored in P1 Match because port P1 is disabled. Instead, a value of 0x0000 would be stored in P1 Match. However, Temp-Primary-Segment would still be decremented by one. The process of storing values in Px Match for enabled primary ports and decrementing Temp-Primary-Segment for all primary ports, whether enabled or disabled, would continue for the other primary ports in the first HT switch 510.

5.6.3 Define Sy Match values

Next, the Sy Match configuration-forwarding table elements that correspond to the secondary ports of the first HT switch 510 may be similarly defined. The value of Temp-Secondary-Segment, i.e., 0x1111, would be stored in S0 Match because port S0 is enabled. Thus, the first HT switch's port S0 is thereby associated with Secondary-Segment 0x1111. Temp-Secondary-Segment would then be decremented by one. The value of Temp-Secondary-Segment, ie., 0x1110 would be stored in S1 Match because port S1 is enabled. This storage also associates port S1 with Secondary-Segment 0x1110. Temp-Secondary-Segment would then be decremented by one. The process of storing values in Sy Match for enabled secondary ports and decrementing Temp-Secondary-Segment for all secondary ports, whether enabled or disabled, would continue for the other secondary ports in the first HT switch 510.

5.6.4 Type1 Configuration Transactions

In one embodiment of the invention, in addition to the type0 configuration read and write transactions that may be issued by the host processor 505, the host processor 505 may also issue type1 configuration read and write transactions. Type1 configuration transactions may be used to configure devices on secondary segments. Type1 configuration transactions instruct the receiving device to forward the transaction to a secondary segment. When the type1 configuration transaction reaches its target bus, it is converted into a type0 configuration read or write transaction by an HT switch. In some embodiments of the invention, the type1 configuration transaction includes a first field, HT-Primary-Segment, which allows the host processor 505 to separately address different primary segments. In addition, the type1 configuration transaction may also include a second field, HT-Secondary-Segment, which allows the host processor 505 to separately address different secondary segments. By including both of these fields in type1 configuration transactions, the host processor 505 may address segments in an efficient hierarchical numbering system. Such addressing is more efficient than addressing with a single "Bus-Number" field that is utilized in the prior art.

5.7 Configuration of the Second HT Switch

After the Px Match and Sy Match elements in the first HT switch's configuration-forwarding table have been defined, the host processor 505 may utilize these elements to configure the second HT switch 515. In one embodiment of the invention, the host processor 505 may issue a type1 read transaction that reads the capabilities of the second HT switch 515 by issuing a type1 configuration read transaction. This transaction would include HT-Primary-Segment equal to 0x1111 and HT-Secondary-Segment equal to 0x1111. The first HT switch 510 would receive the type1 configuration read transaction. Because P0 Match is equal to HT-Primary-Segment, and S0 Match is equal to HT-Secondary-Segment, the first HT switch 510 would convert the type1 configuration transaction into a type0 configuration transaction, and would forward the type0 configuration transaction, via port S0, to the second HT switch 515. (See Section 5.9.2 for other methods of forwarding type1 configuration transactions.) When the second HT switch 515 receives the type0 configuration read transaction, it will provide, via the first HT switch 510, the capabilities of the second HT switch 515. The host processor 505 would then issue type1 configuration write transactions, which would be converted into type0 configuration write transactions to define the elements in the configuration-forwarding table in the second HT switch 515 as discussed above. After configuration, in one embodiment of the invention, the second HT switch's configuration-forwarding table would contain the following values: P0-Match=0x1101; P1-Match=0x0000; S0-Match=0x1101; and S1-Match=0x1100.

5.8 Configuration of the Third HT Switch

The host processor may also issue a type1 read transaction that reads the capabilities of the third HT switch 525 by issuing a type1 configuration read transaction that includes HT-Primary-Segment equal to 0x1111 and HT-Secondary-Segment equal to 0x1110. The first HT switch 510 would receive the type1 configuration read transaction. Because P0 Match is equal to HT-Primary-Segment, and S1 Match is equal to HT-Secondary-Segment, the first HT switch 510 would convert the type1 configuration transaction into a type0 configuration transaction, and would forward the type0 configuration transaction, via port S1, to the third HT switch 525. The third HT switch 525 could then be configured so that its configuration-forwarding table would contain the following values: P0-Match=0x1011; P1-Match=0x0000; S0-Match=0x1011; and S1-Match=0x1010.

5.9 Preparing to Configure the First HT I/O Device

In order to configure the first HT I/O device 520, the host processor needs to issue configuration transactions that traverse both the first HT switch 510 and the second HT switch 515 and then reach the first HT I/O device 520. Thus, in one embodiment of the invention, the host processor may issue a type1 configuration transaction, which is forwarded as a type1 configuration transaction from the first HT switch 510 to the second HT switch 515. The second HT switch 515 would then convert the type1 configuration transaction into a type0 configuration transaction and forward the type0 configuration transaction to the first HT I/O device 520.

5.9.1 Defining the Mask Values in the First HT Switch

In one embodiment of the invention, the host processor may store Mask elements in the configuration-forwarding table so that the elements may be later utilized to determine whether to forward a received type1 configuration transaction as a type0 configuration transaction or as a type1 configuration transaction. In such embodiments, after the third HT switch 525 has been configured as discussed in Section 5.6, the host processor may issue type0 configuration write transactions to define the Px Mask elements and Sy Mask elements in the first HT switch's configuration-forwarding tables. In one embodiment, a value of 0x1111 may be placed in all Px Mask elements that correspond to primary ports that are enabled and a value of 0x0000 may be stored in all Px Mask elements that correspond to primary ports that are disabled. Thus, P0-Mask would be set to 0x1111 because primary port P0 is enabled and P1-Mask would be set to 0x0000 because primary port P1 is disabled. Similarly, a value of 0x1111 may be placed in all Sy Mask elements that correspond to secondary ports that are enabled and a value of 0x0000 may be stored in all Sy Mask elements that correspond to secondary ports that are disabled. Thus, S0-Mask and S1-Mask would both be set to 0x1111 because both secondary ports S0 and S1 are enabled.

5.9.2 Forwarding type1 Configuration Transactions as Type1 Configuration Transactions After the above Mask elements are stored in the first HT switch's configuration-forwarding table, the first HT switch 510 can then utilize the Mask elements to determine whether to forward received type1 configuration transactions as either type0 configuration transactions or type1 configuration transactions. In one embodiment, the first HT switch 510 would forward a type1 transaction that was received on primary port "x" to secondary port "y" as a type0 transaction when the following logical equation is true:

((HT-Primary-Segment & Px Mask)=(Px Match & Px Mask))=1 &&
(HT-Secondary-Segment=Sy Match)=1

In this embodiment, the first HT switch 510 would forward a type1 transaction that was received on primary port "x" to secondary port "y" as a type1 transaction when the following logical equation is true:

((HT-Primary-Segment & Px Mask)=(Px Match & Px Mask))=1 &&
((HT-Secondary-Segment & Sy Mask)=(Sy Match & Sy Mask))=1

5.10 Configuring the First HT I/O Device

As discussed in Section 5.9.2, after storing Mask elements in the first HT switch's configuration-forwarding table, the host processor 505 can issue type1 configuration transactions that allow reading and writing to configuration registers in the first HT I/O device 520. Thus, the host processor 505 can assign the first HT I/O device a Unit ID.

5.11 Configuration of the Fourth HT Switch

Using the methods discussed above, the fourth HT switch's configuration-forwarding table Match values could be defined as follows: P0 Match=0x1011; P1 Match=0x0000; S0 Match=0x0110; and S1 Match=0x0000.

5.12 Configuration of the Second HT I/O Device

Using the methods discussed above, the third HT I/O switch's configuration-forwarding table Mask values could be defined as follows: P0 Mask=0x1111; P1 Mask=0x0000; S0 Mask=0x1111; and S1 Mask=0x0000. After such Mask values are defined, the host processor 505 can then issue type1 configuration transactions that may be forwarded to the second HT I/O device 535 as type0 configuration transactions. Thus, the second HT I/O device 535 may be assigned a Unit D as discussed in Section 5.10.

5.13 Packet-Forwarding Table

In addition to the configuration-forwarding tables discussed above, the HT switches may also include a packet-forwarding table. The packet-forwarding table may be used to forward packets from primary HT segments to secondary HT segments through HT switches. One embodiment of a packet-forwarding table 600 is presented in FIG. 6. The first element in the packet-forwarding table may be identical to the capability ID 205 discussed in Section 5.4.1. Similarly, the second element in the packet-forwarding table, the capabilities pointer, may be identical to the capabilities pointer 210 described in Section 5.4.2.

5.13.1 Command Bits

Figure 6:
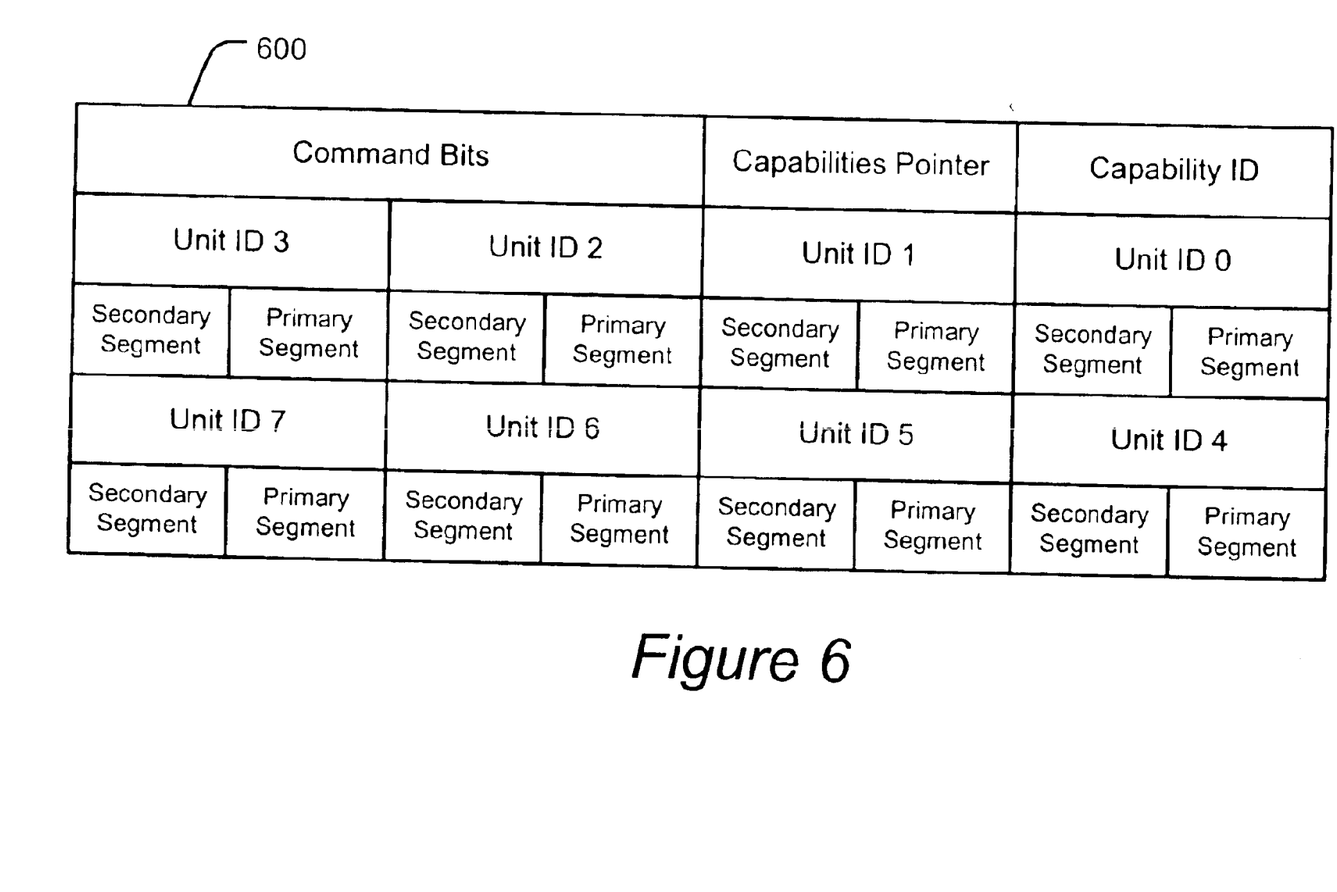
FIG. 6 presents one embodiment of a packet-forwarding table.

The third element in the packet-forwarding table 600 may contain command bits. A first group of the command bits may indicate the number of enabled primary ports present in the HT switch. A second group of the command bits may indicate the number of enabled secondary ports present in the HT switch. The command bits may also include a third group of bits that indicate the layout of the remainder of the packet-forwarding table.

5.13.2 Packet-Forwarding Data

The remainder of the packet-forwarding table contains packet-forwarding data. The packet-forwarding data includes segment numbers for primary segments and secondary segments. These segments have reachable HT devices connected to them. As shown in FIG. 6, the packet-forwarding table may be indexed by Unit IDs. As discussed below, the packet-forwarding data may be utilized by the computer system to forward packets from primary ports to secondary ports and to forward packets from secondary ports to primary ports.

Figure 7:
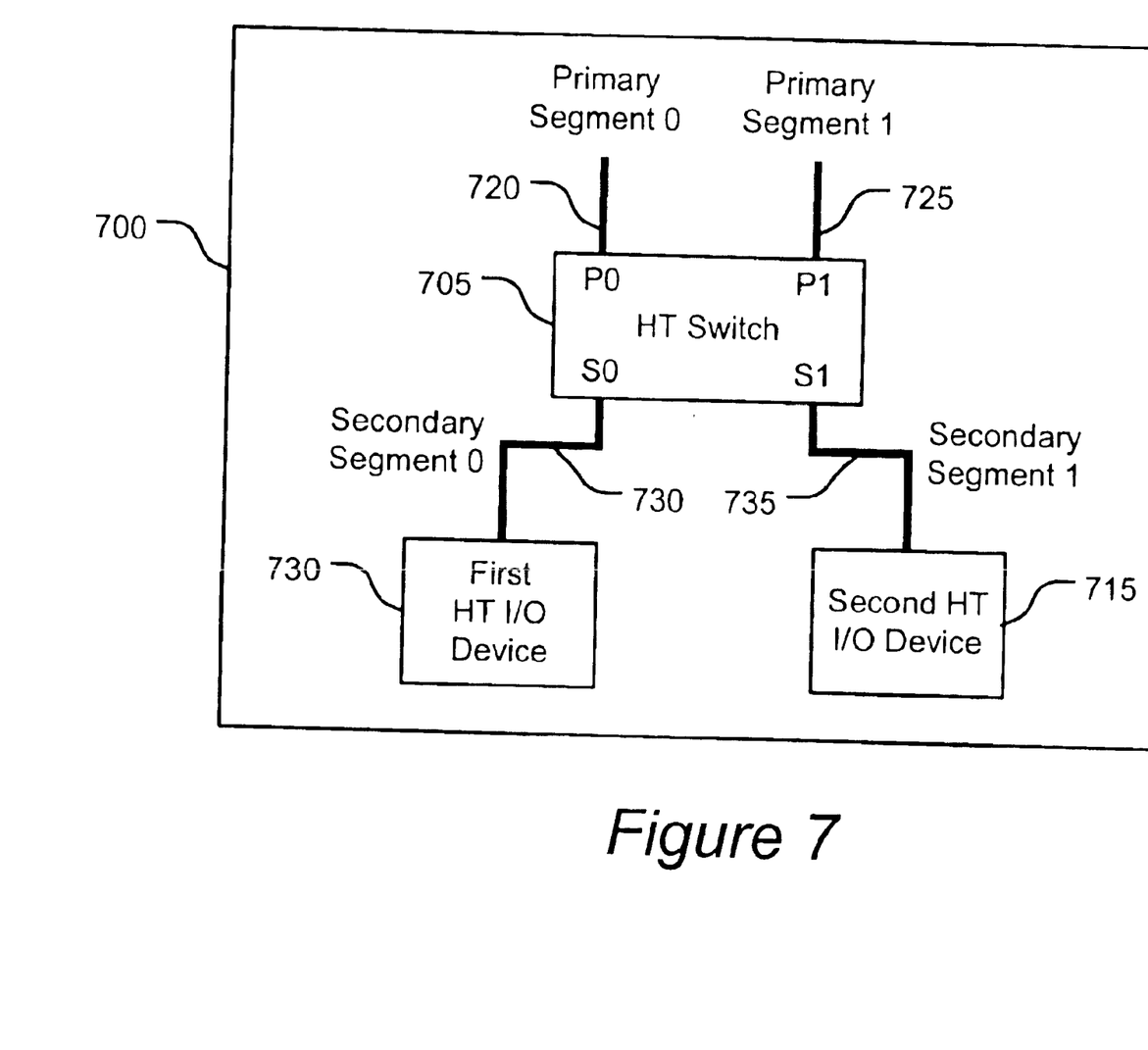
FIG. 7 presents a portion of a computer system.

FIG. 7 presents a portion of a computer system 700. As can be seen in FIG. 7, an HT switch 705 is coupled to two HT I/O devices. The HT switch 705 is also coupled to other devices in the computer system via its primary ports P0 and P1. These devices are not shown. The first HT I/O device 730 has previously been assigned Unit ID 0. This device is coupled to the HT switch's S0 port. The second HT I/O device 715 has previously been assigned Unit ID 1. The second I/O device 715 is coupled to the HT switch's S1 port.

Figure 8:
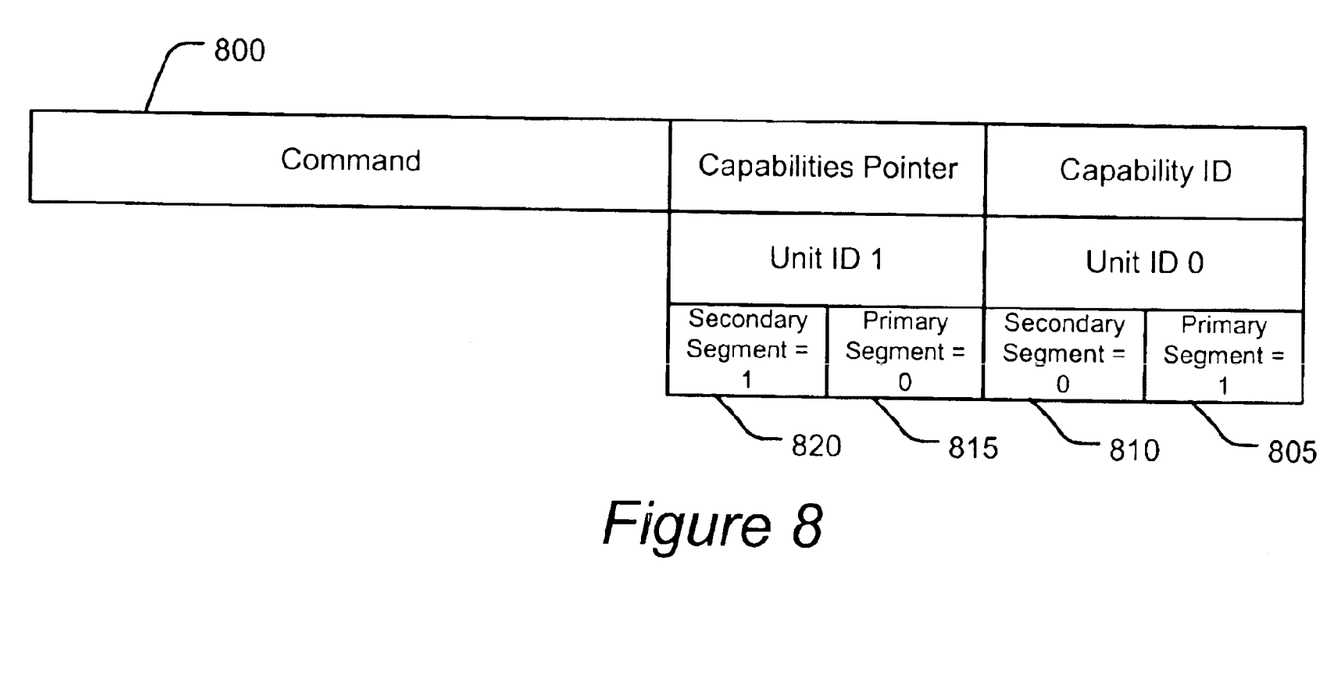
FIG. 8 presents another embodiment of a packet-forwarding table.
Figure 9:
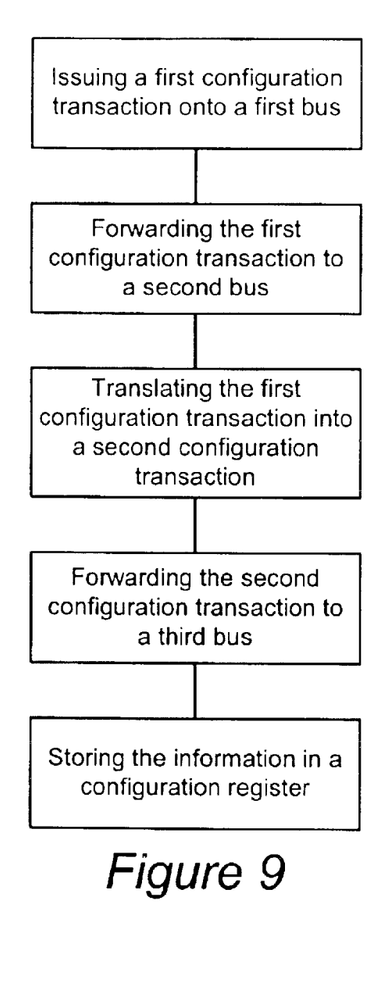
FIG. 9 presents one method of storing information in a configuration register in a device.
Figure 10:
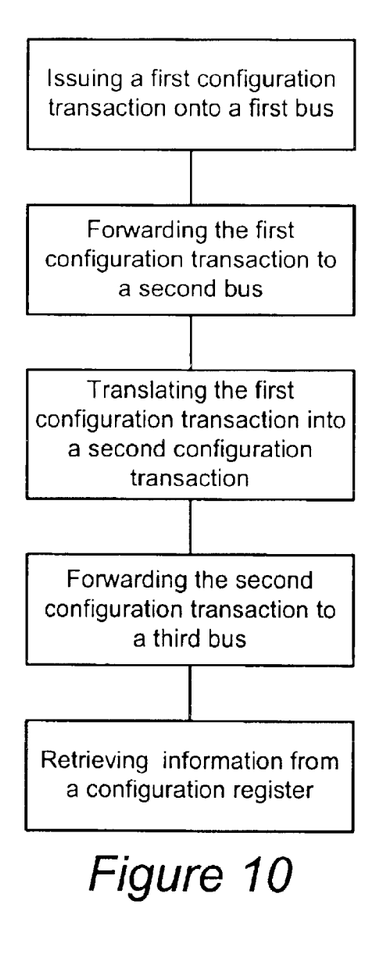
FIG. 10 presents one method of retrieving information from a configuration register in a device.
Figure 11:
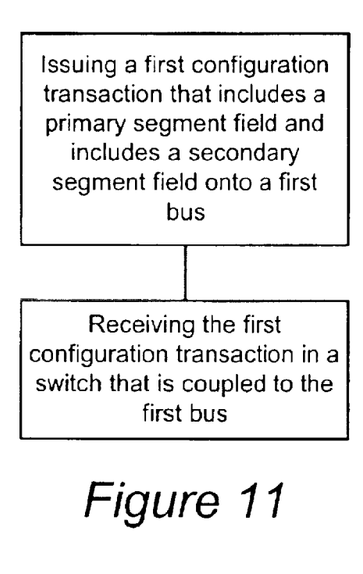
FIG. 11 presents one method of issuing a configuration transaction.
Figure 12:
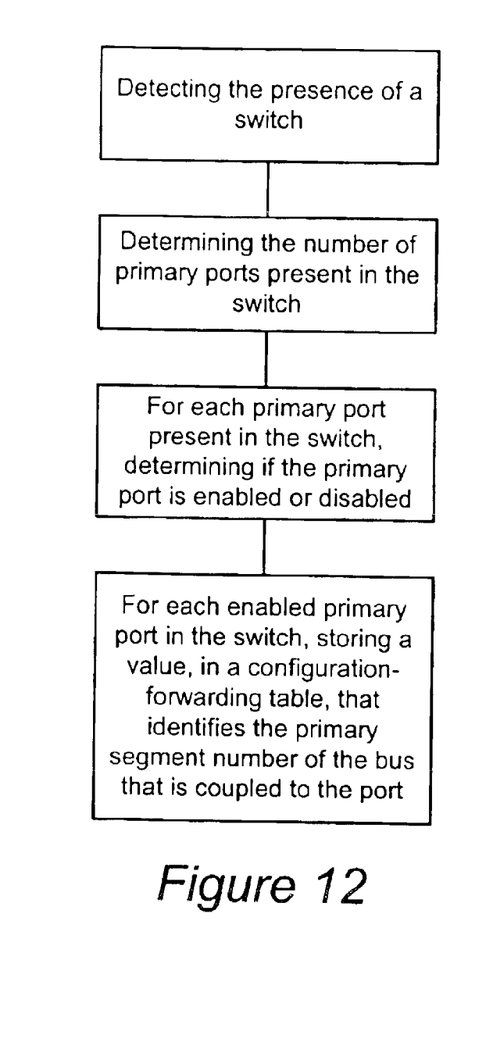
FIG. 12 presents one method of generating a configuration-forwarding table.
Figure 13:
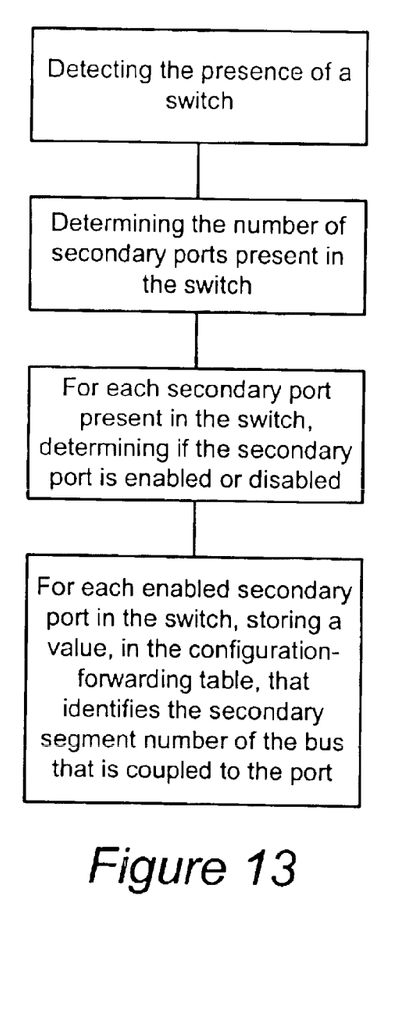
FIG. 13 presents another method of generating a configuration-forwarding table.
Figure 14:
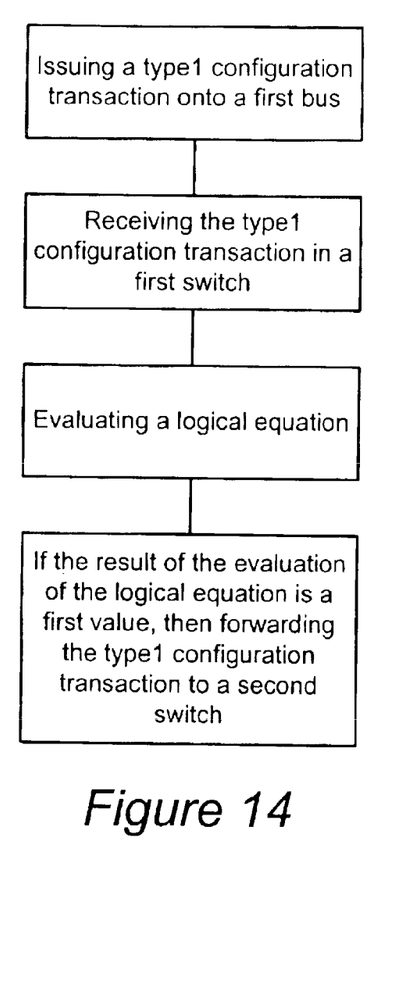
FIG. 14 presents one method of forwarding a configuration transaction.
Figure 15:
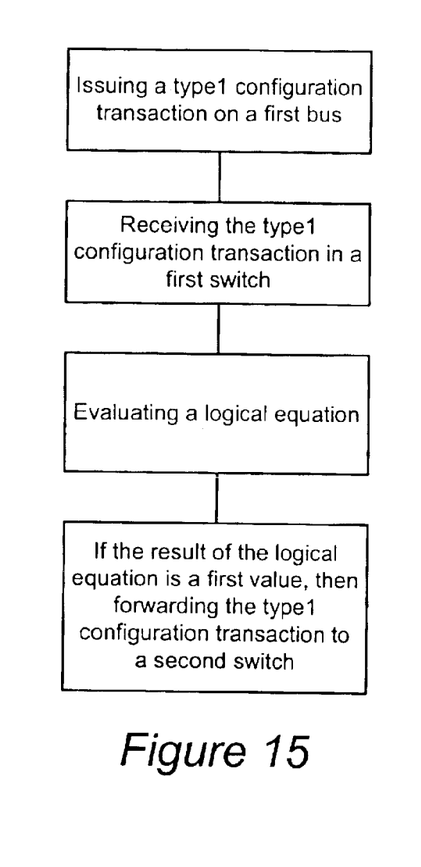
FIG. 15 presents another method of forwarding a configuration transaction.
Figure 16:
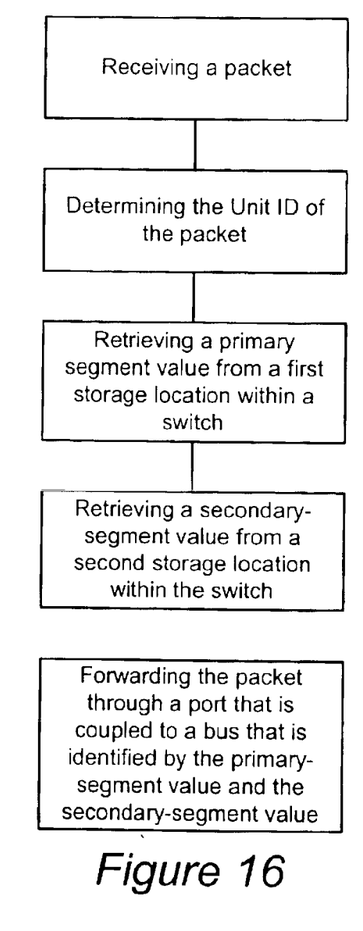
FIG. 16 presents one method of forwarding a packet.

FIG. 8 presents a packet-forwarding table 800. Packet-forwarding table 800 contains data that may be utilized by a computer system to forward packets from the HT switch's primary ports to the HT switch's secondary ports. For each Unit ID, the table contains a Primary-Segment value and a Secondary-Segment value. These values may be determined from the data obtained during the generation of the configuration-forwarding table.

One method of utilizing the packet-forwarding table 800 to forward packets follows. When the HT switch 705 receives a packet, the HT switch determines the Unit D of the incoming packet. Next, the HT switch 705 looks up the Unit ID in the packet-forwarding table. Then the HT switch 705 retrieves the Primary-Segment value and the Secondary-Segment value. Finally, the retrieved values are utilized to identify the outgoing port and forward the packet.

For example, element 805, Primary-Segment=1, and element 810, Secondary-Segment=0, define a path through HT switch 705 for packets with a Unit ID equal to 0. Thus, any packet received with a unit ID equal to "0" from Primary-Segment 1 725 would always be forwarded to Secondary-Segment 0 730. Similarly element 815, Primary-Segment=0, and element 820, Secondary-Segment=1, define a path through HT switch 705 for packets with a Unit D) equal to 1. Thus, any packet received with a unit ID equal to "1" from Primary-Segment 0 720 would always be forwarded to Secondary-Segment 1 715.

Element 805, 810, 815, and 820 may also be utilized to define a path from the HT switch's secondary ports to the HT switch's primary ports. Thus, any packet received with a unit ID equal to "0" would always be forwarded to Primary-Segment 1 725. Similarly, any packet received with a unit ID equal to "I" would always be forwarded to Primary-Segment 0 720. Thus, the packet-forwarding table may be utilized to efficiently forward packets through HT switches.

5.14 CONCLUSION

The foregoing descriptions of embodiments of the present invention have been presented for purposes of illustration and description only. They are not intended to be exhaustive or to limit the present invention to the forms disclosed. For example, the above description discusses computer systems with one or more HT I/O interconnectes. However, the invention is not limited to such computer systems. The invention may be utilized on computer systems with other types of buses. Accordingly, many modifications and variations may be apparent to practitioners skilled in the art. For example, FIGS. 9 through 16 are alternative embodiments of the invention. Additionally, the above disclosure is not intended to limit the present invention. The scope of the present invention is defined by the appended claims.

What is claimed is:

1. A method, performed by a computer system that includes a host processor coupled to a first bus, a first HT switch coupled to the first bus and a second bus, a second HT switch coupled to the second bus and a third bus, and a device coupled to the third bus, of storing information in a configuration register in the device, the method comprising:
    a) issuing a first configuration transaction onto the first bus;
    b) forwarding the first configuration transaction to the second bus;
    c) translating the first configuration transaction into a second configuration transaction;
    d) forwarding the second configuration transaction to the third bus; and
    e) storing information in the configuration register.

2. The method of claim 1, wherein the act of issuing the first configuration transaction includes a host processor issuing the first configuration transaction.

3. The method of claim 1, wherein the act of issuing the first configuration transaction includes issuing a HT configuration transaction.

4. The method of claim 1, wherein the act of issuing the first configuration transaction includes issuing a type1 configuration transaction.

5. The method of claim 1, wherein the act of issuing the first configuration transaction includes issuing the first configuration transaction onto a bus that is coupled to a third HT switch.

6. The method of claim 1, wherein the act of issuing the first configuration transaction includes issuing the first configuration transaction onto a bus that is coupled to an I/O device.

7. The method of claim 1, wherein the act of issuing a first configuration transaction includes issuing the first configuration to the first HT switch.

8. The method of claim 1, wherein the act of forwarding the first configuration transaction includes the first HT switch forwarding the first configuration transaction.

9. The method of claim 1, wherein the act of forwarding the first configuration transaction includes forwarding a type1 configuration transaction.

10. The method of claim 1, wherein the act of translating the first configuration transaction into a second configuration transaction includes translating a type1 configuration transaction into a type0 configuration transaction.

11. The method of claim 1, wherein the act of storing information includes storing a primary-segment number.

12. The method of claim 1, wherein the act of storing information includes storing a secondary-segment number.

13. The method of claim 1, wherein the act of storing information includes storing a Unit ID.

14. The method of claim 1, wherein the first configuration transaction contains a primary-segment field and a secondary-segment field.

15. A method, performed by a computer system that includes a host processor coupled to a first bus, a first HT switch coupled to the first bus and a second bus, a second HT switch coupled to the second bus and a third bus, and a device coupled to the third bus, of retrieving information from a configuration register in the device, the method comprising:
   a) issuing a first configuration transaction onto the first bus;
   b) forwarding the first configuration transaction to the second bus;
   c) translating the first configuration transaction into a second configuration transaction;
   d) forwarding the second configuration transaction to the third bus; and
   e) retrieving information from the configuration register.

16. The method of claim 15, wherein the act of issuing the first configuration transaction includes a host processor issuing the first configuration transaction.

17. The method of claim 15, wherein the act of issuing the first configuration transaction includes issuing an HT configuration transaction.

18. The method of claim 15, wherein the act of issuing the first configuration transaction includes issuing a type1 configuration transaction.

19. The method of claim 15, wherein the act of issuing the first configuration transaction includes issuing the first configuration transaction onto a bus that is coupled to a third HT switch.

20. The method of claim 15, wherein the act of issuing the first configuration transaction includes issuing the first configuration transaction onto a bus that is coupled to an I/O device.

21. The method of claim 15, wherein the act of issuing a first configuration transaction includes issuing the first configuration to the first HT switch.

22. The method of claim 15, wherein the act of forwarding the first configuration transaction includes the first HT switch forwarding the first configuration transaction.

23. The method of claim 16, wherein the act of forwarding the first configuration transaction includes forwarding a type1 configuration transaction.

24. The method of claim 15, wherein the act of translating the first configuration transaction into a second configuration transaction includes translating a type1 configuration transaction into a type0 configuration transaction.

25. The method of claim 15, wherein the act of retrieving the information includes sending the information to the host processor.

26. The method of claim 15, wherein the act of retrieving the information includes sending the information to the second HT switch.

27. The method of claim 15, wherein the act of retrieving the information includes retrieving capabilities information.

28. A method, performed by a computer system that includes a host processor coupled to a bus, and a HT switch coupled to the bus, the method comprising:
   a) issuing a configuration transaction that includes a primary-segment field and includes a secondary-segment field onto the bus; and
   b) receiving the configuration transaction in the HT switch.

29. A method, performed by a computer system that includes a host processor coupled to a bus, and a HT switch coupled to the bus, of generating a configuration-forwarding table, the method comprising:
   a) detecting the presence of the HT switch;
   b) determining the number of primary ports present in the HT switch;
   c) for each primary port present in the HT switch, determining if the primary port is enabled or disabled; and
   d) for each enabled primary port in the HT switch, storing a value in the configuration-forwarding table that identifies a primary segment number of the bus that is coupled to the port.

30. The method of claim 29, further including:
   e) for each disabled primary port in the HT switch, storing a value that indicates that no segments are coupled to the disabled port.

31. The method of claim 29 further comprising:
   e) for each enabled primary port present in the HT switch, storing a value in the configuration-forwarding table that indicates a span of the highest numbered segment that is coupled to the port of the HT switch.

32. The method of claim 31, wherein the act of storing the value includes storing a value that indicates the span of the highest numbered primary segment that is coupled to the port of the HT switch.

33. A method, performed by a computer system that includes a host processor coupled to a first bus, and a HT switch coupled to the first bus, of generating a configuration-forwarding table, the method comprising:
   a) detecting the presence of the HT switch;
   b) determining the number of secondary ports present in the HT switch;
   c) for each secondary port present in the HT switch, determining if the secondary port is enabled or disabled; and
   d) for each enabled secondary port in the HT switch, storing a value in the configuration-forwarding table that identifies a secondary segment number of the bus that is coupled to the port.

34. The method of claim 33, further including:
   e) for each disabled secondary port in the HT switch, storing a value that indicates that no segments are coupled to the disabled port.

35. The method of claim 33 further comprising:

f) for each enabled secondary port present in the HT switch, storing a value in the configuration-forwarding table that indicates a span of the highest numbered segment that is coupled to the port of the HT switch.

36. The method of claim 35, wherein the act of storing the value includes storing a value that indicates the span of the highest numbered secondary segment that is coupled to the port of the HT switch.

37. A method, performed by a computer system that includes a host processor coupled to a first bus, a first HT switch coupled to the first bus and a second bus, and a second HT switch coupled to the second bus, of forwarding a configuration transaction comprising:

a) issuing a type1 configuration transaction on the first bus;

b) receiving the type1 configuration transaction in the first HT switch;

c) evaluating a logical equation; and d) if the result of the evaluation of the logical equation is a first value, then forwarding the type1 configuration transaction to the second HT switch.

38. The method of claim 37, wherein the act of evaluating a logical equation includes evaluating a first value from a configuration-forwarding table.

39. A method, performed by a computer system that includes a host processor that is coupled to a first bus, and an HT switch that is coupled to the first bus, of forwarding a packet comprising:

a) receiving a packet;

b) determining the Unit ID of the packet;

c) retrieving a primary-segment value from a first storage location within the HT switch;

d) retrieving a secondary-segment value from a second storage location within the HT switch; and e) forwarding the packet through a port that is coupled to a bus that is identified by the primary-segment value and the secondary-segment value.

40. The method of claim 39, wherein the act of retrieving the primary-segment includes retrieving the primary-segment from a table based upon the value of the Unit ID.

41. The method of claim 39, wherein the act of retrieving the secondary-segment includes retrieving the secondary-segment from a table based upon the value of the Unit ID.

* * * * *